United States Patent
Duncan

(10) Patent No.: US 11,380,320 B2
(45) Date of Patent: Jul. 5, 2022

(54) ELECTRIC TOOL SYSTEM, CHARGER, ELECTRIC TOOL, AND VOICE CONTROL METHOD THEREOF, AUTOMATIC WORKING SYSTEM, CHARGING STATION, SELF-MOVING DEVICE, AND VOICE CONTROL METHOD THEREOF

(71) Applicant: Positec Power Tools (Suzhou) Co., Ltd, Jiangsu (CN)

(72) Inventor: Thomas Ellis Duncan, Charlotte, NC (US)

(73) Assignee: Positec Power Tools (Suzhou) Co., Ltd., Suzhou (CN)

(*) Notice: Subject to any disclaimer, the term of this patent is extended or adjusted under 35 U.S.C. 154(b) by 151 days.

(21) Appl. No.: 16/649,954

(22) PCT Filed: Sep. 25, 2018

(86) PCT No.: PCT/CN2018/107407
§ 371 (c)(1),
(2) Date: Mar. 23, 2020

(87) PCT Pub. No.: WO2019/057214
PCT Pub. Date: Mar. 28, 2019

(65) Prior Publication Data
US 2020/0227040 A1 Jul. 16, 2020

(30) Foreign Application Priority Data
Sep. 25, 2017 (CN) .......................... 201710876389.X

(51) Int. Cl.
*G10L 15/22* (2006.01)
*H02J 7/00* (2006.01)
(Continued)

(52) U.S. Cl.
CPC ............ *G10L 15/22* (2013.01); *A47L 9/2857* (2013.01); *A47L 11/4005* (2013.01);
(Continued)

(58) Field of Classification Search
USPC ........................................................ 704/1–504
See application file for complete search history.

(56) References Cited

U.S. PATENT DOCUMENTS

| | | | |
|---|---|---|---|
| 2003/0119442 A1* | 6/2003 | Kwak | H04W 88/021 455/462 |
| 2014/0159920 A1* | 6/2014 | Furui | H02J 7/00 340/870.07 |

(Continued)

FOREIGN PATENT DOCUMENTS

| | | |
|---|---|---|
| CN | 103869892 A | 6/2014 |
| CN | 105142482 A | 12/2015 |

(Continued)

*Primary Examiner* — Marcus T Riley
(74) *Attorney, Agent, or Firm* — Dentons US LLP

(57) ABSTRACT

An electric tool system, including an electric tool and a charger. The electric tool system includes: a voice obtaining component, obtaining voice information from a user; and a control module, obtaining instruction information generated based on the voice information, and controlling the electric tool system based on the instruction information to perform a corresponding action, where the electric tool system includes: a voice processing component, at least configured to generate information that corresponds to the voice information and satisfies a transmission format of a communications component; and the communications component, sending the information processed by the voice processing component to a server, receiving response information from the server, and providing the response information to the control module, where the instruction information includes the response information. The beneficial effects of the present invention are as follows: A user may directly send a (Continued)

request by using voice information, thereby conveniently obtaining various required information or implementing various controls, so that an electric tool system becomes a "personal worksite assistant" of the user, thereby extending the functions of the electric tool system.

12 Claims, 7 Drawing Sheets

(51) Int. Cl.
*A47L 9/28* (2006.01)
*A47L 11/40* (2006.01)
*G05B 19/042* (2006.01)
*G06F 1/16* (2006.01)
*G06F 3/16* (2006.01)
*G10L 15/30* (2013.01)
*H01M 10/46* (2006.01)
*H01M 50/20* (2021.01)

(52) U.S. Cl.
CPC ........ *A47L 11/4011* (2013.01); *G05B 19/042* (2013.01); *G06F 1/16* (2013.01); *G06F 3/167* (2013.01); *G10L 15/30* (2013.01); *H01M 10/46* (2013.01); *H01M 50/20* (2021.01); *H02J 7/00032* (2020.01); *H02J 7/0042* (2013.01); *G05B 2219/23386* (2013.01); *G10L 2015/223* (2013.01); *H01M 2220/30* (2013.01)

(56) References Cited

U.S. PATENT DOCUMENTS

| | | | | |
|---|---|---|---|---|
| 2014/0324271 | A1* | 10/2014 | Oh | G05D 1/0251 701/28 |
| 2015/0357684 | A1* | 12/2015 | Willgert | H02J 7/007 320/112 |
| 2016/0311094 | A1* | 10/2016 | Mergener | H02J 7/0024 |
| 2020/0227040 | A1* | 7/2020 | Duncan | G06F 3/167 |

FOREIGN PATENT DOCUMENTS

| | | |
|---|---|---|
| CN | 106535730 A | 3/2017 |
| KR | 1020160008780 A | 1/2016 |
| WO | 2017073955 A1 | 5/2017 |

* cited by examiner

US 11,380,320 B2

ELECTRIC TOOL SYSTEM, CHARGER, ELECTRIC TOOL, AND VOICE CONTROL METHOD THEREOF, AUTOMATIC WORKING SYSTEM, CHARGING STATION, SELF-MOVING DEVICE, AND VOICE CONTROL METHOD THEREOF

This application is the National Stage filing under 35 U.S.C. 371 of International Application No. PCT/CN2018/107407, filed on Sep. 25, 2018, which claims benefit of and priority to Chinese Patent Application No. 201710876389.X, filed on Sep. 25, 2017, all of which are hereby incorporated by reference in their entirety for all purposes as if fully set forth herein.

BACKGROUND

Technical Field

The present disclosure relates to an electric tool system, a charger, an electric tool, and a voice control method thereof, and further relates to an automatic working system, a charging station, a self-moving device, and a voice control method thereof.

Related Art

Electric tools are widely used work tools, and are, for example, electric drills and electric saws in industrial application and some self-moving devices such as robotic sweepers and automatic lawn mowers in home application.

In a scenario in which a user uses an electric tool, sometimes the user needs to search for some information such as weather information or information related to the use of the electric tool. Based on a related technology, the user only can perform search with a device such as a mobile phone or a computer, causing inconvenience to the user.

SUMMARY

The embodiments of the present invention provide an electric tool system, comprising an electric tool and a charger, the electric tool comprising: a working component, configured to perform a working task; a drive component, driving the working component to perform the working task; and a battery pack, providing the drive component with electric power required for driving the working component, the battery pack comprises an electric power input interface, the charger comprises an electric power output interface, fitting the electric power input interface of the battery pack to replenish the battery pack with electrical energy; the electric tool system comprises a voice obtaining component, obtaining voice information from a user; a control module, obtaining instruction information generated based on the voice information, and controlling the electric tool system based on the instruction information to perform a corresponding action, the electric tool system comprises a voice processing component, at least configured to generate information that corresponds to the voice information and satisfies a transmission format of a communications component; and the communications component, sending the information processed by the voice processing component to a server, receiving response information from the server, and providing the response information to the control module, the instruction information comprises the response information.

In an embodiment, the voice processing component is further configured to recognize the voice information, and the control module obtains the instruction information based on the voice information recognized by the voice processing component.

In an embodiment, the communications component sends voice information to be recognized to the server, and after the voice information is recognized, obtains the instruction information based on the recognized voice information.

In an embodiment, the voice information comprises search information, and the communications component sends the search information to the server and receives the response information corresponding to the search information from the server.

In an embodiment, the search information comprises operation guidance, expert information or public service information associated with the electric tool.

In an embodiment, the voice information comprises status detection information, and the control module detects the status of the electric tool system according to the status detection information and obtains the instruction information from the electric tool system.

In an embodiment, the status detection information comprises fault detection information, battery level detection information or working duration detection information.

In an embodiment, the voice information comprises control information, and the voice processing component processes the control information and generates the instruction information.

In an embodiment, the control information comprises charging control information.

In an embodiment, the electric tool system comprises an output component, and the control module controls the output component to output the instruction information.

In an embodiment, the output component comprises a loudspeaker or a display screen.

In an embodiment, the voice obtaining component, the voice processing component, and the communications component are all integrated in the charger.

In an embodiment, the communications component comprises at least one of a Wireless Fidelity (Wi-Fi) unit, a cellular network unit, a Bluetooth unit, and a ZigBee unit.

In an embodiment, the communications component is further configured to communicate with a smart terminal of the user to receive the voice information obtained by the smart terminal of the user or send the instruction information to the smart terminal of the user, so that the smart terminal of the user outputs corresponding information.

In an embodiment, the battery pack is integrated in the electric tool or the battery pack is detachably connected to the electric tool.

In an embodiment, the electric tool comprises an electric gardening device.

The embodiments of the present invention provide a charger, configured to replenish a battery pack of an electric tool with electrical energy, the charger comprises an electric power output interface, configured to fit an electric power input interface of the battery pack, and the charger comprises a voice obtaining component, obtaining voice information from a user; and a control module, obtaining instruction information generated based on the voice information, and controlling the charger based on the instruction information to perform a corresponding action, the charger comprises a voice processing component, at least configured to generate information that corresponds to the voice information and satisfies a transmission format of a communications component; and the communications component, sending the information processed by the voice processing component to a server, receiving response information from the server, and providing the response information to the control module, the instruction information comprises the response information.

The embodiments of the present invention provide an electric tool, comprising a working component, configured to perform a working task; a drive component, driving the working component to perform the working task; a battery pack, providing the drive component with electric power required for driving the working component; a voice obtaining component, obtaining voice information from a user; and a control module, obtaining instruction information generated based on the voice information, and controlling the electric tool based on the instruction information to perform a corresponding action, the electric tool comprises a voice processing component, at least configured to generate information that corresponds to the voice information and satisfies a transmission format of a communications component; and the communications component, sending the information processed by the voice processing component to a server, receiving response information from the server, and providing the response information to the control module, the instruction information comprises the response information.

The embodiments of the present invention provide a voice control method for an electric tool system, an electric tool system comprises an electric tool and a charger, the electric tool comprises a battery pack, the charger replenishes the battery pack with electrical energy, and the method comprises the steps:

obtaining voice information from a user;

generating information that corresponds to the voice information and satisfies a transmission format of a communications component;

sending the generated information to a server by using the communications component;

receiving response information from the server; and obtaining instruction information generated based on the voice information, and controlling the electric tool system based on the instruction information to perform a corresponding action, the instruction information comprises the response information.

In an embodiment, the performing a corresponding action based on the instruction information comprises: outputting the instruction information.

The embodiments of the present invention provide a voice control method for a charger, a charger configured to replenish a battery pack of an electric tool with electrical energy, the charger comprises an electric power output interface, configured to fit an electric power input interface of the battery pack, and the method comprises the steps:

obtaining voice information from a user;

generating information that corresponds to the voice information and satisfies a transmission format of a communications component;

sending the generated information to a server by using the communications component;

receiving response information from the server; and obtaining instruction information generated based on the voice information, and controlling the charger based on the instruction information to perform a corresponding action, the instruction information comprises the response information.

The embodiments of the present invention provide a voice control method for an electric tool, comprising a working component, configured to perform a working task; a drive component, driving the working component to perform the working task; and the method comprises the steps:

obtaining voice information from a user;

generating information that corresponds to the voice information and satisfies a transmission format of a communications component;

sending the generated information to a server by using the communications component;

receiving response information from the server; and obtaining instruction information generated based on the voice information, and controlling the electric tool based on the instruction information to perform a corresponding action, the instruction information comprises the response information.

The embodiments of the present invention provide an automatic working system, comprising a self-moving device and a charging station, the self-moving device moves and works in a working area; the self-moving device comprises a battery pack, providing electric power for the self-moving device to move and work; and the charging station is used for the self-moving device to stop and for replenishing the battery pack with electrical energy; and the automatic working system comprises a voice obtaining component, obtaining voice information from a user; and a control module, obtaining instruction information generated based on the voice information, and controlling the automatic working system based on the instruction information to perform a corresponding action, the automatic working system comprises: a voice processing component, at least configured to generate information that corresponds to the voice information and satisfies a transmission format of a communications component; and the communications component, sending the information processed by the voice processing component to a server, receiving response information from the server, and providing the response information to the control module, the instruction information comprises the response information.

In an embodiment, the automatic working system comprises an output component, and the control module controls the output component to output the instruction information.

In an embodiment, the self-moving device comprises an automatic lawn mower.

The embodiments of the present invention provide a charging station, used for a self-moving device to stop and for replenishing a battery pack of the self-moving device with electrical energy, and comprising a voice obtaining component, obtaining voice information from a user; and a control module, obtaining instruction information generated based on the voice information, and controlling the charging station based on the instruction information to perform a corresponding action, the charging station comprises: a voice processing component, at least configured to generate information that corresponds to the voice information and satisfies a transmission format of a communications component; and the communications component, sending the information processed by the voice processing component to a server, receiving response information from the server, and providing the response information to the control module, the instruction information comprises the response information.

In an embodiment, the charging station further comprises an output component, and the control module controls the output component to output the instruction information.

The embodiments of the present invention provide a self-moving device, moving and working in a working area, and comprising a working module, performing a working task; a movement module, driving the self-moving device to move in a working area; a control module, controlling the working module to perform the working task, and controlling the movement module to drive the self-moving device to move; a battery pack, providing electric power for the self-moving device to move and work; and a voice obtaining component, obtaining voice information from a user, the control module obtains instruction information generated based on the voice information, and controls the self-moving device based on the instruction information to perform a corresponding action, the self-moving device comprises a voice processing component, at least configured to generate information that corresponds to the voice information and satisfies a transmission format of a communications component; and the communications component, sending the information processed by the voice processing component to a server, receiving response information from the server, and providing the response information to the control module, the instruction information comprises the response information.

In an embodiment, the self-moving device further comprises an output component, and the control module controls the output component to output the instruction information.

In an embodiment, the self-moving device comprises an automatic lawn mower.

In an embodiment, the battery pack is integrated in the self-moving device, or the battery pack is detachably connected to the self-moving device.

The embodiments of the present invention provide a voice control method for an automatic working system, the automatic working system comprises a self-moving device and a charging station, the self-moving device moves and works in a working area, the charging station is used for the self-moving device to stop and for replenishing a battery pack of the self-moving device with electrical energy, and the control method for the automatic working system comprises the steps:

obtaining voice information from a user;

generating information that corresponds to the voice information and satisfies a transmission format of a communications component;

sending the generated information to a server by using the communications component;

receiving response information from the server; and obtaining instruction information generated based on the voice information, and controlling the automatic working system based on the instruction information to perform a corresponding action, the instruction information comprises the response information.

The embodiments of the present invention provide a voice control method for a charging station, a charging station used for a self-moving device to stop and for replenishing a battery pack of the self-moving device with electrical energy, and the method comprises the steps:

obtaining voice information from a user;

generating information that corresponds to the voice information and satisfies a transmission format of a communications component;

sending the generated information to a server by using the communications component;

receiving response information from the server; and obtaining instruction information generated based on the voice information, and controlling the charging station based on the instruction information to perform a corresponding action, the instruction information comprises the response information.

The embodiments of the present invention provide a voice control method for a self-moving device, a self-moving device moving and working in a working area, and comprising a working module, performing a working task; a movement module, driving the self-moving device to move in a working area; a control module, controlling the working module to perform the working task, and controlling the movement module to drive the self-moving device to move; and the method comprises the steps:

obtaining voice information from a user;

generating information that corresponds to the voice information and satisfies a transmission format of a communications component;

sending the generated information to a server by using the communications component;

receiving response information from the server; and obtaining instruction information generated based on the voice information, and controlling the self-moving device based on the instruction information to perform a corresponding action, the instruction information comprises the response information.

According to various aspects of the present invention, a user may directly send a request by using voice information, thereby conveniently obtaining various required information or implementing various controls, so that an electric tool system becomes a "personal worksite assistant" of the user, thereby extending the functions of the electric tool system.

BRIEF DESCRIPTION OF THE DRAWINGS

The accompanying drawings that are incorporated in this specification and constitute a part of this specification and this specification show together the exemplary embodiments of the present invention, and are used for describing the principle of the present invention.

DETAILED DESCRIPTION

Figure 1:
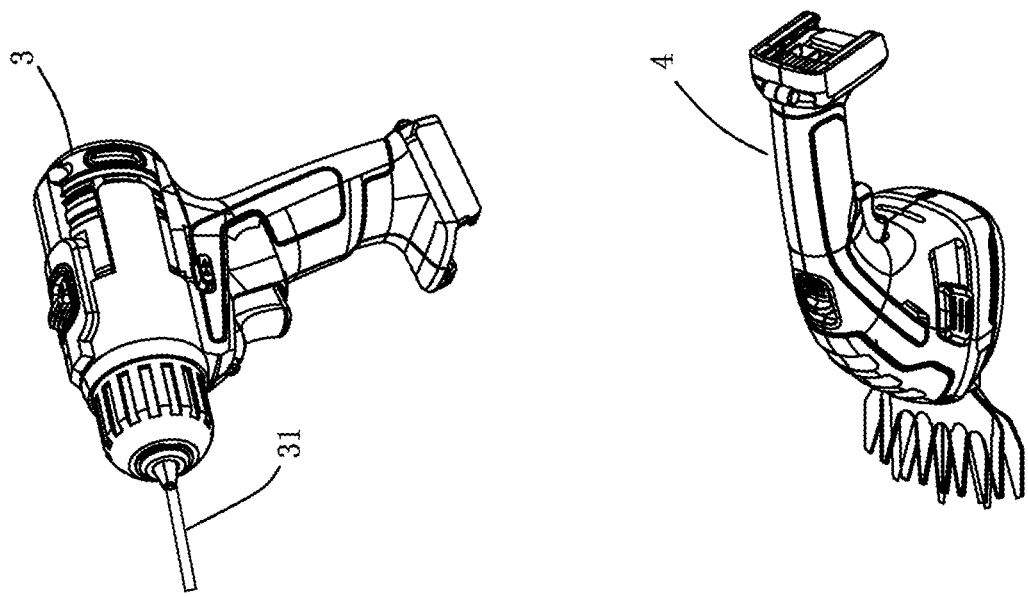
FIG. 1 is a schematic diagram of an electric tool system according to an embodiment of the present invention.

Various exemplary embodiments, features, and aspects of the present disclosure are described below in detail with reference to the accompanying drawings. Same reference numerals represent elements with the same or similar functions in the accompanying drawings. Although various aspects of the embodiments are shown in the accompanying drawings, unless specially specified, the accompanying drawings are not necessarily drawn in actual proportion.

The term "exemplary" specially used herein" means "used as an example, an embodiment or a description". Any embodiment described as "exemplary" herein is not construed as being superior to or better than another embodiment.

In addition, numerous specific details are provided in the following specific implementations to better describe the present disclosure. A person skilled in the art should understand that the present disclosure can still be implemented without some specific details. In some examples, methods, measures, elements, and circuits well known to a person skilled in the art are not described in detail to highlight the theme of the present disclosure.

In this embodiment, an electric tool may be, for example, an electric drill or an electric saw, or may be an electric gardening device, for example, an automatic lawn mower.

FIG. 1 is a schematic diagram of an electric tool system according to an embodiment of the present invention. In this embodiment, an electric tool system 100 includes at least one electric tool (3, 4) and a charger 1. The electric tool includes: a working component, configured to perform a working task; a drive component, driving the working component to perform the working task; and a battery pack 7, providing the drive component with electric power required for driving the working component, the battery pack 7 including an electric power input interface 71. For example, when the electric tool is an electric drill 3, the working component includes a drill bit 31. The drive component includes a motor (not shown) for driving the drill bit 31 to rotate. The battery pack 7 provides the electric drill 3 with the electric power required for working. The battery pack may be integrated in the electric tool or may be detachably connected to the electric tool. The charger may replenish the battery pack with electrical energy in a detached state or may replenish the electric tool integrated with the charger with electrical energy. In this embodiment, the battery pack is detachably connected to the electric tool. In this embodiment, the charger includes an electric power output interface 11 fitting the electric power input interface 71 of the battery pack 7 to replenish the battery pack 7 with electrical energy. The fitting between the electric power output interface 11 and the electric power input interface 71 may be a wired connection between electrical terminals or may be a wireless connection.

Figure 2:
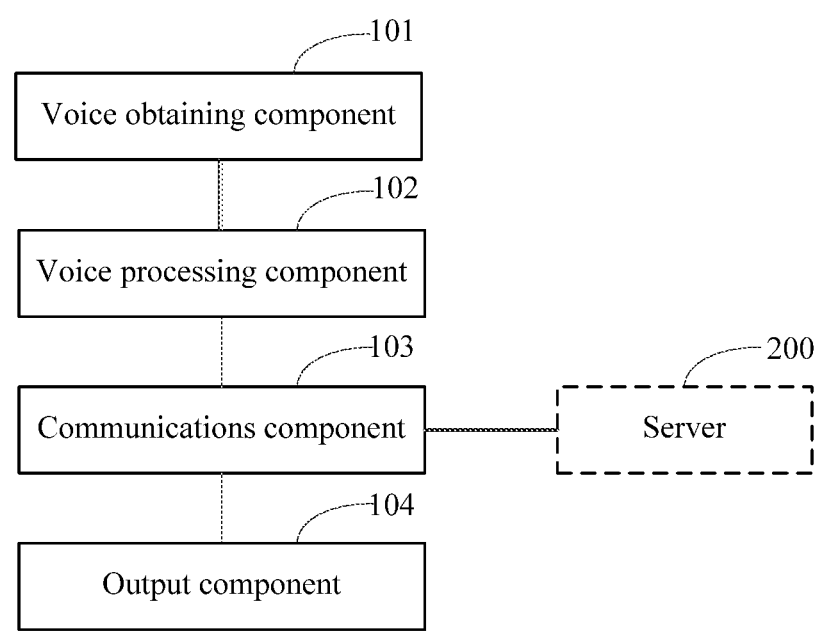
FIG. 2 is a modular diagram of an electric tool system according to an embodiment of the present invention.

Referring to FIG. 2, in this embodiment, the electric tool system includes a voice obtaining component 101 obtaining voice information from a user. In an exemplary application scenario, the user speaks a requirement to form voice information. The voice obtaining component 101 may be any device such as a microphone that can acquire a sound signal. The electric tool system further includes a control module (not shown), obtaining instruction information generated based on the voice information, and controlling the electric tool system based on the instruction information to perform a corresponding action. The electric tool system includes a voice processing component 102 at least configured to generate information that corresponds to the voice information and satisfies a transmission format of a communications component. Specifically, voice processing includes conversion of the voice information from an analog signal into a digital signal. The electric tool system includes a communications component 103, sending the information processed by the voice processing component to a server 200, receiving response information from the server 200, and providing the response information to the control module. The instruction information includes the response information. The communications component 103 may include any one or more of a Wireless Fidelity (Wi-Fi) unit, a cellular network unit, a Bluetooth unit, and a ZigBee unit. The electric tool system further includes an execution component, electrically connected to the control module, and performing a corresponding action based on the instruction information. Specifically, the execution component includes an output component 104, outputting the instruction information. The output component 104 may include a loudspeaker or a display screen. In an embodiment, the output component may convert the received information into voice based on a related technology such as Text-To-Voice (TTS) for output. Compared with a conventional a prompt manner such as an indicator lamp, the user may conveniently and intuitively receive required information of the user.

In this embodiment, the recognition of voice information may be implemented locally by the voice processing component 102 or may be implemented by a remote server. In an implementation, the voice processing component 102 is further configured to recognize voice information, and the control module obtains instruction information based on the voice information recognized by the voice processing component 102. In another implementation, the communications component 103 sends voice information to be recognized to the server, and after the voice information is recognized, obtains the instruction information based on the recognized voice information. In an implementation, the voice processing component 102 is further configured to generate instruction information based on recognition information obtained through recognition of voice information, and the control module controls the electric tool system based on the instruction information. In another implementation, the communications component 103 receives the instruction information from the server and provides the instruction information to the control module. The control module controls the electric tool system based on the instruction information.

Specifically, the voice information input by the user includes search information and may be search information for external information of the electric tool system, and the external information includes operation guidance, expert information, public service information or the like associated with the electric tool. For example, the search information may be search information related to a site at which the user operates the electric tool, and includes a measurement computation request (for example, "What is half of ⅝ inch?"), a tool selection request (for example, "Which is the best reciprocating blade for cutting stainless steel?"), a construction suggestion request (for example, "How much wood flooring do I need for a room measuring 8 meters by 12 meters?") or the like or may be an expert contact request (for example, "What is the phone number of the top plumber nearby?") or the like or may be a weather search request or the like. The communications component sends the search information to the server and receives the response information corresponding to the search information from the server. Specifically, when the voice information input by the user is the search information, the local voice processing component recognizes the voice information, and the communications component sends the recognized voice information to the server and receives corresponding response information from the server; or, the communications component sends voice information to be recognized to the server, and the server recognizes the voice information and feeds back corresponding response information. The control module obtains the response information, and controls the electric tool system based on the response information to perform a corresponding action, for example, controls the loudspeaker to output found information.

The voice information input by the user includes status detection information, which may be information for searching the status of the electric tool system. The control module detects the status of the electric tool system according to the status detection information and obtains the instruction information from the electric tool system. The status detection information includes fault detection information (for example, "Why can't the battery be charged?"), battery level detection information (for example, "What is the remaining battery level of the battery?" and "How long does it still take to fully charge the battery?"), working duration detection information (for example, "How long can the current battery level last?") or the like. The electric tool system correspondingly detects the status of an electric tool, a charger or a battery pack according to the input status detection information, and generates instruction information according to a detection result. For example, if the voice information is recognized as remaining charging time detection, the system generates a corresponding request instruction, provides the request instruction to a corresponding information acquisition component, and calculates the remaining charging time according to a read remaining battery level and a charging curve (representing a relationship curve between current and voltage and time during charging). If the voice information is recognized as fault detection, the system generates a corresponding request instruction, provides the request instruction to a corresponding information acquisition component, for example, a sensor data acquisition component, reads a fault code of a sensor, and parses the fault code to obtain a fault type or cause. Similarly, voice recognition may be locally completed or may be completed by a remote server. The control module controls the electric tool system based on the instruction information to perform a corresponding action, for example, controls the loudspeaker to output a current battery level, fault information or the like, to replace the indicator lamp of the electric tool.

The voice information input by the user includes control information, and the voice processing component processes the control information and generates the instruction information. The control information includes charging control information (for example, "Charge the battery to 30%"), so that customized charging can be implemented. When the electric tool is a self-moving device, the control information may include running control information (for example, "Stop", "Turn left", and "Accelerate") and the like. After obtaining the corresponding instruction information, the control module controls the electric tool system to perform a corresponding action. The voice processing component may provide the generated instruction information to the corresponding execution component of the electric tool system to perform control. For example, for the charging control information, the corresponding instruction information may be generated and provided to a charger, and the instruction information may include information being "Charge" and the target being "30%" of charging, the control module controls the charger to charge the battery pack, and charging is stopped when charging reaches 30% to implement "Charge the battery to 30%".

In an embodiment, the communications component is further configured to communicate with a smart terminal of the user to receive the voice information obtained by the smart terminal of the user or send the instruction information to the smart terminal of the user, so that the smart terminal of the user outputs corresponding information. The smart terminal of the user includes a smartphone, a PAD, and the like. In an embodiment, the smart terminal of the user may replace the voice obtaining component or the output component in the electric tool system.

In the foregoing embodiments, a user may directly send a request by using voice information, thereby conveniently obtaining various required information and/or implementing various controls and providing more manners for interaction between the user and an electric tool system, so that the electric tool system becomes a "personal worksite assistant" of the user, thereby extending the functions of the electric tool system.

One or more of the voice obtaining component, the voice processing component, the communications component, and the output component may be integrated in a charger. In an embodiment, the voice obtaining component, the voice processing component, the communications component, and the output component are all integrated in the charger. The charger may charge the battery pack, and the battery pack may supply power to different types of tools. That is, one charger may be used in combination with different types of tools. The charger is universal. In an embodiment, the charger can charge both the electric tool and another device such as an electronic device. The charger is universal and therefore is more advantageous for use as a "personal worksite assistant".

Certainly, in another embodiment, the voice obtaining component, the voice processing component, the communications component, and the output component may also be integrated in the electric tool.

Correspondingly, an embodiment of the present invention provides a charger, replenishing a battery pack of an electric tool with electrical energy. The charger includes an electric power output interface, configured to fit an electric power input interface of the battery pack. The charger includes: a voice obtaining component, obtaining voice information from a user; and a control module, obtaining instruction information generated based on the voice information, and controlling the charger based on the instruction information to perform a corresponding action. The charger includes: a voice processing component, at least configured to generate information that corresponds to the voice information and satisfies a transmission format of a communications component. The communications component sends the information processed by the voice processing component to a server, receives response information from the server, and provides the response information to the control module, where the instruction information includes the response information. Features related to voice control in this embodiment are similar to those above, and are not described again.

An embodiment of the present invention provides an electric tool, including: a working component, configured to perform a working task; a drive component, driving the working component to perform the working task; a battery pack, providing the drive component with electric power required for driving the working component; a voice obtaining component, obtaining voice information from a user; and a control module, obtaining instruction information generated based on the voice information, and controlling the electric tool based on the instruction information to perform a corresponding action. The electric tool includes: a voice processing component, at least configured to generate information that corresponds to the voice information and satisfies a transmission format of a communications component. The communications component sends the information processed by the voice processing component to a server, receives response information from the server, and provides the response information to the control module, where the instruction information includes the response information. Features related to voice control in this embodiment are similar to those above, and are not described again.

The embodiments of the present invention provide a voice control method for an electric tool system, including the following steps.

S11: Obtain voice information from a user.

S12: Generate information that corresponds to the voice information and satisfies a transmission format of a communications component.

S13: Send the generated information to a server by using the communications component.

S14: Receive response information from the server.

S15: Obtain instruction information generated based on the voice information, and control an electric tool system based on the instruction information to perform a corresponding action, where the instruction information includes the response information.

Specifically, the performing a corresponding action based on the instruction information in S15 includes: outputting the instruction information.

The voice control method may be performed by a charger or may be performed by an electric tool.

Figure 3:
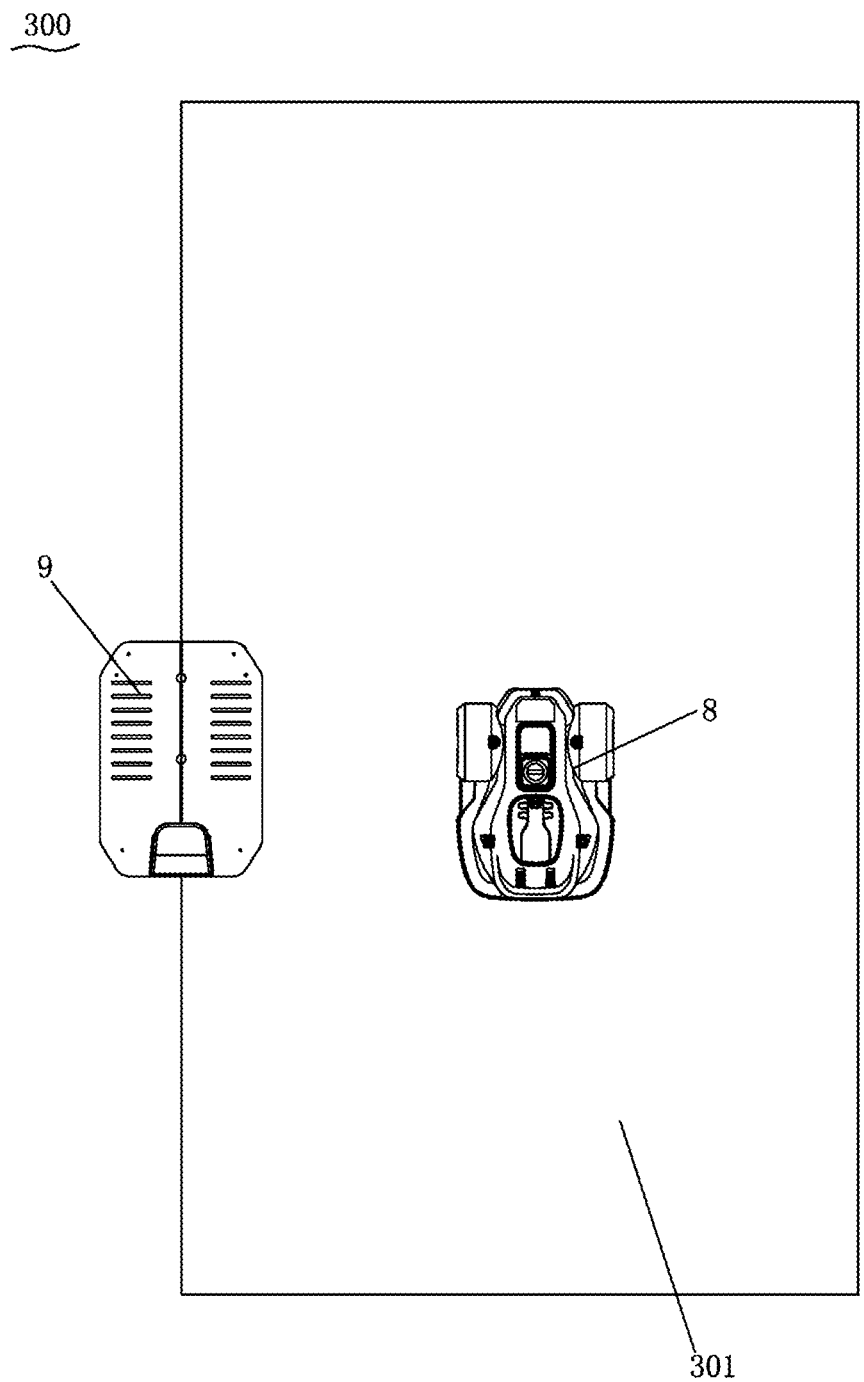
FIG. 3 is a schematic diagram of an automatic working system according to an embodiment of the present invention.
Figure 4:
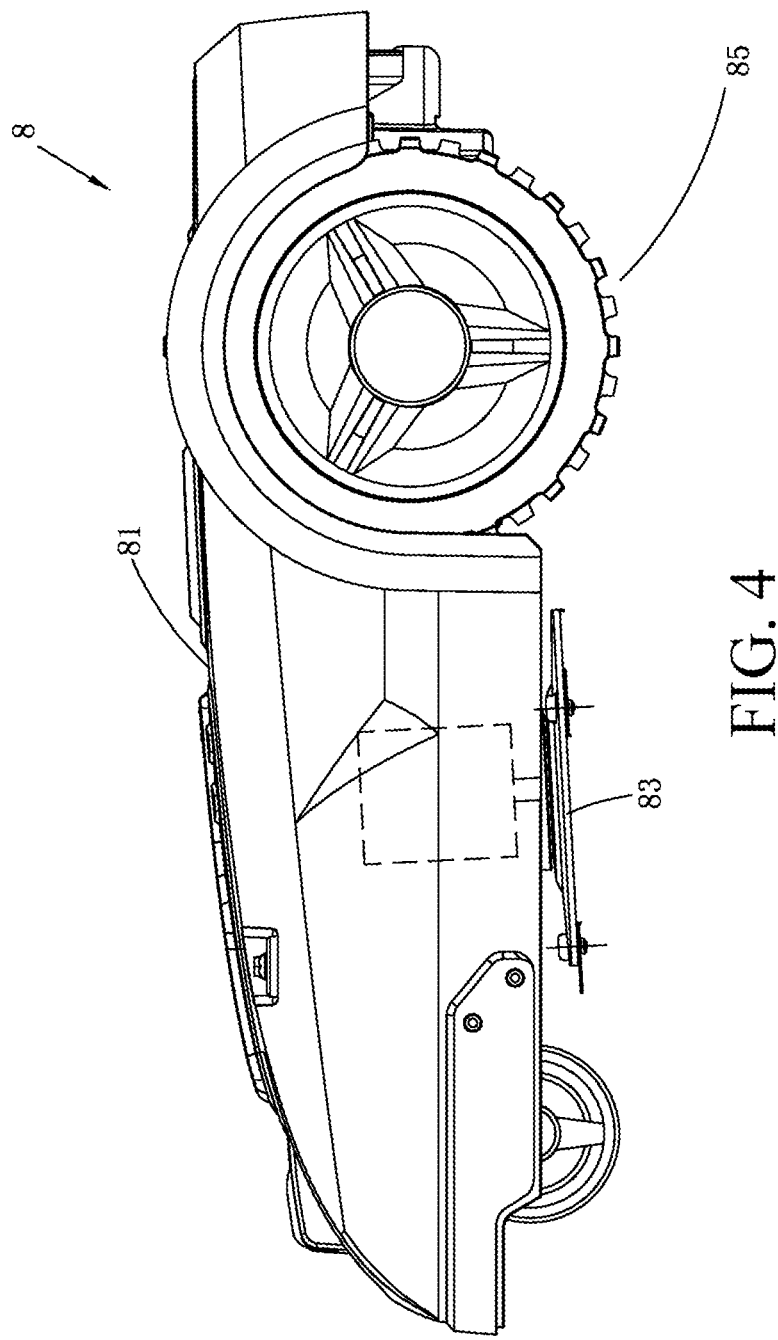
FIG. 4 is a schematic diagram of an automatic lawn mower according to an embodiment of the present invention.

The embodiments of the present invention provide an automatic working system. As shown in FIG. 3, an automatic working system 300 includes a self-moving device and a charging station 9. The self-moving device moves and works in a working area 301. The charging station 9 is used for the self-moving device to stop and for replenishing the self-moving device with electric power required for movement and working. In this embodiment, the self-moving device is an automatic lawn mower. In another embodiment, the self-moving device may be alternatively an unsupervised device such as an automatic vacuum cleaner or an automatic snowplow. Referring to FIG. 4, in this embodiment, an automatic lawn mower 8 includes a housing 81, a working module 83, and a movement module 85. The working module 83 and the movement module 85 are mounted at the housing 81. The movement module 85 is driven by a drive motor to drive the automatic lawn mower 8 to move. The working module 83 includes a cutting deck, mounted at the bottom of the housing 81, and driven by a cutting motor to rotate to perform a mowing task. The automatic lawn mower 8 includes a first control apparatus (not shown), controlling the working module 83 to perform a working task, and controlling the movement module 85 to move. The automatic lawn mower includes a battery pack (not shown), providing electric power for the automatic lawn mower 8 to move and work. The battery pack may be integrated in the automatic lawn mower 8 or may be detachably connected to the automatic lawn mower 8. When needing to replenish the battery pack with electrical energy, the automatic lawn mower 8 can automatically return to the charging station 9 to be docked to the charging station 9. The charging station 9 replenishes the battery pack with electrical energy.

In this embodiment, the automatic working system 300 includes a voice obtaining component, obtaining voice information from a user; a control module (including a first control apparatus), obtaining instruction information generated based on the voice information, and controlling the automatic working system based on the instruction information to perform a corresponding action. The automatic working system includes: a voice processing component, at least configured to generate information that corresponds to the voice information and satisfies a transmission format of a communications component. The communications component sends the information processed by the voice processing component to a server, receives response information from the server, and provides the response information to the control module, where the instruction information includes the response information. The automatic working system includes an output component, and the control module controls the output component to output the instruction information. In this embodiment, features related to voice control of the automatic working system are similar to those above, and are not described again.

One or more of the voice obtaining component, the voice processing component, the communications component, and the output component may be integrated in the charging station or the self-moving device. In an embodiment, the voice obtaining component, the voice processing component, the communications component, and the output component are all integrated in the charging station. In another embodiment, the voice obtaining component, the voice processing component, the communications component, and the output component are all integrated in the self-moving device.

Correspondingly, an embodiment of the present invention provides a charging station, used for a self-moving device to stop and for replenishing a battery pack of the self-moving device with electrical energy. The charging station includes: a voice obtaining component, obtaining voice information from a user; and a control module, obtaining instruction information generated based on the voice information, and controlling the charging station based on the instruction information to perform a corresponding action. The charging station includes: a voice processing component, at least configured to generate information that corresponds to the voice information and satisfies a transmission format of a communications component. The communications component sends the information processed by the voice processing component to a server, receives response information from the server, and provides the response information to the control module, where the instruction information includes the response information. In this embodiment, features related to voice control of the charging station are similar to those above, and are not described again.

An embodiment of the present invention provides a self-moving device, moving and working in a working area. The self-moving device includes: a working module, performing a working task; a movement module, driving the self-moving device to move in the working area; a control module, controlling the working module to perform the working task, and controlling the movement module to drive the self-moving device to move; a battery pack, providing electric power for the self-moving device to move and work; and a voice obtaining component, obtaining voice information from a user. The control module obtains instruction information generated based on the voice information, and controls the self-moving device based on the instruction information to perform a corresponding action. The self-moving device includes: a voice processing component, at least configured to generate information that corresponds to the voice information and satisfies a transmission format of a communications component. The communications component sends the information processed by the voice processing component to a server, receives response information from the server, and provides the response information to the control module, where the instruction information includes the response information.

The embodiments of the present invention provide a voice control method for an automatic working system, including the following steps.

S21: Obtain voice information from a user.

S22: Generate information that corresponds to the voice information and satisfies a transmission format of a communications component.

S23: Send the generated information to a server by using the communications component.

S24: Receive response information from the server.

S25: Obtain instruction information generated based on the voice information, and control the automatic working system based on the instruction information to perform a corresponding action, where the instruction information includes the response information.

Specifically, the performing a corresponding action based on the instruction information in S25 includes: outputting the instruction information.

The voice control method may be performed by a charging station or may be performed by a self-moving device.

Figure 5:
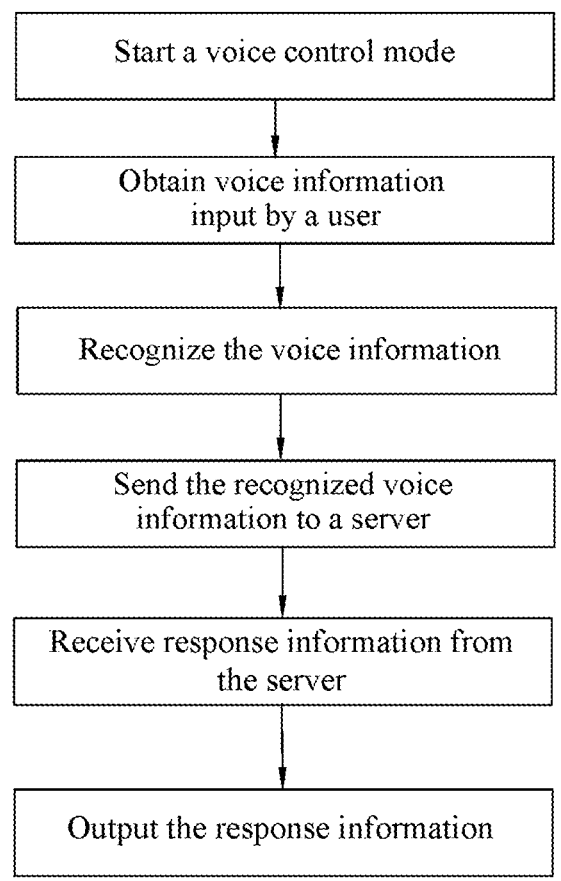
FIG. 5 is a flowchart of a voice processing method according to an embodiment of the present invention.

For ease of understanding, an application example is provided below with reference to FIG. 5. FIG. 5 is a flowchart of a voice processing method for an electric tool system according to an embodiment of the present invention. Referring to FIG. 3, in the embodiment shown in FIG. 5, a voice obtaining component, a voice processing component, a communications component, and an output component are all integrated in a charging station 9. The voice obtaining component includes a microphone, and the output component includes a loudspeaker. In a possible application scenario, when starting an automatic lawn mower 8, a user wants to know how long the automatic lawn mower 8 needs to work every day to cut a lawn with an area of 500 $m^2$. The user may turn on a voice control switch on the charging station 9 and speak to the microphone to input a voice request: "How long does it take every day to cut a lawn with an area of 500 $m^2$?" In this embodiment, voice recognition is locally completed. The voice processing component performs template matching to recognize keywords such as "cut", "area", "500 $m^2$", and "how long" in the request of the user. Optionally, a control module may control the loudspeaker to repeat a voice input of the user or ask the user to confirm the request of the user. For example, the loudspeaker outputs: "Do you want to know how long it takes every day to cut a lawn with an area of 500 $m^2$?" The control module stores a voice control program. The program may be set to perform a next action when receiving confirmation information of the user. For example, when receiving a voice input "Yes", the program performs a next action. In this embodiment, a charger 9 uses a wireless communications component to send information including the keywords "cut", "area", "500 $m^2$", and "how long" to a remote server, and receives response information from the server. The response information is, for example, "Cut 4 hours every day." The control module controls the loudspeaker to output the response information. In an embodiment, the output component may be a display screen. The response information may be a work table of the automatic lawn mower 8. The control module controls the display screen to display the work table of the lawn mower. After obtaining the response information, the user may manually set a working time of the automatic lawn mower 8 according to the response information or may input an instruction "Confirm" to enable the automatic lawn mower 8 to automatically work according to the work table. In an embodiment, the voice control program may be turned on when the user inputs a specified voice signal. For example, the voice control program is turned on when the user speaks "Hi, robot." By using voice control, the user may conveniently obtain various information of a worksite and does not need to consult complex data, thereby facilitating the use of an electric tool by the user.

The automatic lawn mower is still used as an example. In another possible application scenario, the user expects the automatic lawn mower 8 to return to the charging station 9 for charging. The user speaks to the microphone of the charging station 9 to input a voice request: "Return to the charging station for charging". The voice processing component processes voice information input by the user and generates instruction information, and sends the instruction information to the automatic lawn mower 8 by using the wireless communications component of the charging station 9. The wireless communications component of the automatic lawn mower 8 receives the instruction information, and a first control apparatus of the automatic lawn mower 8 controls the automatic lawn mower 8 according to the instruction information to return to the charging station 9. After the automatic lawn mower 8 returns to the charging station, the user may further use a voice to control a charging battery level or the like of the automatic lawn mower 8. By using voice control, the user may conveniently implement the control of an automatic working system 300. Certainly, the user may further use a voice to search for a working status, fault information or the like of the automatic working system 300.

An automatic lawn mower is used as an example in the foregoing application example. In an electric tool system including an electric drill, an electric saw, and the like, a procedure of voice control is similar to that above and is not described again. It may be understood that after a voice control function is integrated in a charger of the electric tool system, the charger can be used as a personal worksite assistant of the user and can also be used as a home assistant that provides a feedback according to various voice inputs of the user. The feedback is, for example, playing music, or chatting with the user. When a voice assistant function is integrated in the charger of the electric tool system, the user may not need to buy a separate voice device, thereby extending applications of the electric tool system.

Figure 6:
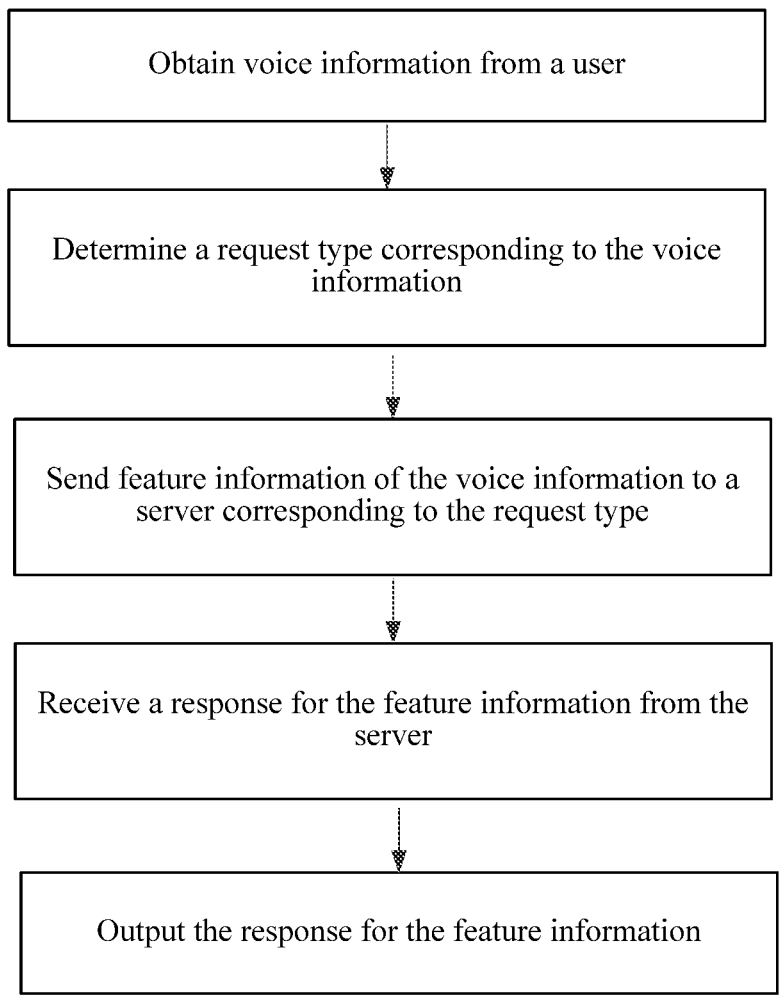
FIG. 6 is a flowchart of a voice processing method according to another embodiment of the present invention.

FIG. 6 is a flowchart of a voice processing method according to another embodiment of the present invention.

A voice processing component may determine a request type corresponding to voice information based on a related technology such as voice recognition. For example, the voice processing component may extract keywords in voice information as feature information of the voice information based on a related technology such as mode matching, prestore a correspondence between feature information and a request type, and therefore determine a request type corresponding to the voice information according to the feature information and the correspondence.

The feature information discussed above may be a keyword included in the voice information, thereby reducing a data amount of communication between a communications component and a server and a processing burden of the server. The feature information may be voice information.

When providing feature information of voice information to the communications component, the voice processing component may provide a request type, for example, an external search request or an internal search request, corresponding to the voice information. The communications component may send feature information of voice information of different request types to different servers such as an external server and an internal server according to a prestored correspondence between a request type and a server, receive a response from the server, and provide the received response to an output component for output.

By using the foregoing exemplary implementations, the electric tool system may automatically distinguish between different request types of a user and send a request to a corresponding server, so that the user obtains more accurate responses.

The foregoing components may be implemented by software, hardware or a combination of software and hardware. For example, various components may be implemented by a microprocessor, a microcontroller, a programmable logic array or the like in combination with a computer program instruction or may be implemented by using dedicated hardware such as an application-specific integrated circuit or may be implemented by a combination of the two.

Figure 7:
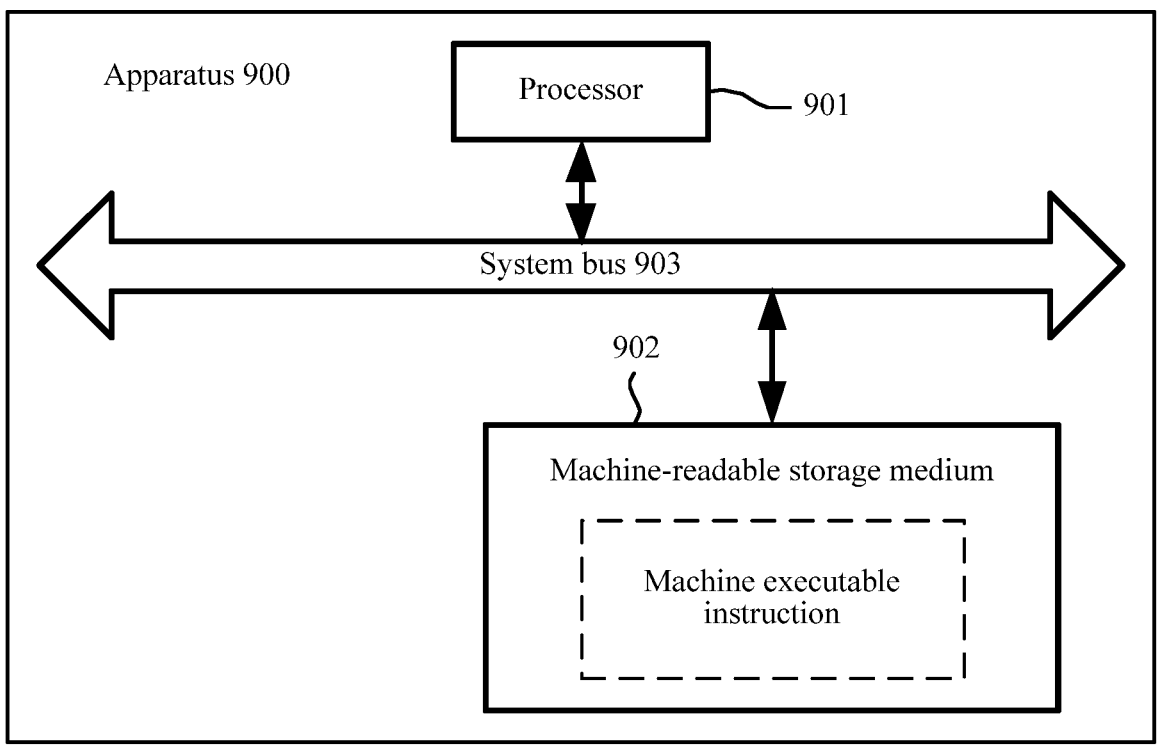
FIG. 7 is a block diagram of a voice processing apparatus according to an embodiment of the present invention.

FIG. 7 is a block diagram of a voice processing apparatus according to an exemplary embodiment. Referring to FIG. 7, a voice processing apparatus 900 may include a processor 901 and a machine-readable storage medium 902 storing a machine executable instruction. The processor 901 and the machine-readable storage medium 902 may communicate through a system bus 903. Moreover, the processor 901 reads a machine executable instruction corresponding to the voice processing apparatus in the machine-readable storage medium 902 to perform the foregoing voice processing method.

The machine-readable storage medium 902 mentioned herein may be any electronic, magnetic, optical or other physical storage apparatus, and may contain or store information such as an executable instruction or data. For example, the machine-readable storage medium may be a random access memory (RAM), a volatile memory, a non-volatile memory, a flash memory, a storage driver (for example, a hard disk driver), a solid-state hard disk, any type of storage disk (for example, an optical disc or a digital versatile disc (DVD)), a similar storage medium or a combination thereof.

Various embodiments of the present invention have been described above, and the foregoing description is exemplary and non-exhaustive and is not limited to the disclosed embodiments. Many modifications and changes are obvious to a person of ordinary skill in the art without departing from the scope and spirit of the described embodiments. The terms used herein are chosen to optimally explain the principle and actual application of the embodiments or technical improvements made to the technology in the market or enable other persons of ordinary skill in the art to understand the embodiments disclosed herein.

What is claimed is:

1. A charger, for replenishing a battery pack of an electric tool with electrical energy, wherein the charger is configured to:
   obtain, voice information from a user, the voice information comprising at least one of search information or status detection information,
   wherein the search information comprises operation guidance, expert information, or public service information associated with the electric tool, and
   wherein the status detection information indicates a status of the electric tool system or an instruction information from a user;
   perform, an action which corresponds to the instruction information which is generated from the voice information;
   process, the voice information, and generate information that corresponds to the voice information and satisfies a transmission format for communication;
   receive, response information from a server when sending the information processed to the server and providing the response information to perform an corresponding action, the response information corresponding to at least one of the search information or the status detection information,
   wherein obtaining the voice information, processing the voice information, and receiving the response information are all integrated in the charger.

2. The charger of claim 1, wherein the charger is configured to recognize the voice information, and obtain the instruction information based on the voice information recognized by a voice processing component.

3. The charger of claim 1, wherein the charger is configured to send voice information to be recognized to the server, and after the voice information is recognized, obtain the instruction information based on the recognized voice information.

4. The charger of claim 1, wherein the status detection information comprises fault detection information, battery level detection information, or working duration detection information.

5. The charger of claim 1, wherein the voice information comprises control information, and a voice processing component processes the control information and generates the instruction information.

6. The charger of claim 5, wherein the control information comprises charging control information.

7. The charger of claim 1, wherein the charger comprises an output component, and a control module controls the output component to output the instruction information.

8. The charger of claim 7, wherein the output component comprises a loudspeaker or a display screen.

9. The charger of claim 1, wherein the charger comprises at least one of a Wireless Fidelity (Wi-Fi) unit, a cellular network unit, a Bluetooth unit, and a ZigBee unit.

10. The charger of claim 1, wherein the charger is configured to communicate with a smart terminal of the user to receive the voice information obtained by the smart terminal of the user or send the instruction information to the smart terminal of the user, so that the smart terminal of the user outputs corresponding information.

11. An electric tool, including a charger according to claim 1, the electric tool, comprising:
    a working component performing a working task and a drive component driving the electric tool in working area; and
    a battery pack, providing electric power required for driving the electric tool,
    wherein the battery pack comprises an electric power input interface.

12. A voice control method for a charger, the charger adapts to an electric tool system, wherein the electric tool system comprises an electric tool and a battery pack, and wherein the charger replenishes the battery pack with electrical energy, the method comprising the following steps:
    obtaining voice information from a user, the voice information comprising at least one of search information or status detection information,
    wherein the search information comprises operation guidance, expert information, or public service information associated with the electric tool, and
    wherein the status detection information indicates a status of the electric tool system or an instruction information from a user;
    generating information that corresponds to the voice information and satisfies a transmission format for communication;
    sending the generated information to a server;
    receiving response information from the server; and
    obtaining instruction information generated based on the voice information, and controlling the electric tool system based on the instruction information to perform a corresponding action, wherein the instruction information comprises the response information, and the response information corresponding to at least one of the search information or the status detection information, wherein obtaining the voice information, generating and sending information that corresponds to the voice information, receiving the response information are all integrated in the charger, obtaining instruction information generated based on the voice information.

\* \* \* \* \*